Sept. 6, 1932.  J. H. McEVOY  1,875,632

UNIVERSAL CASING HEAD AND GAS SAVER

Filed Feb. 23, 1929

J. H. McEvoy  INVENTOR

BY  Jesse R. Stone
ATTORNEY

Patented Sept. 6, 1932

1,875,632

UNITED STATES PATENT OFFICE

JOSEPH H. McEVOY, OF HOUSTON, TEXAS

UNIVERSAL CASING HEAD AND GAS SAVER

Application filed February 23, 1929. Serial No. 341,922.

My invention relates to an improved type of casing head and attachments therefor for use in well drilling and pumping operations in deep wells, such as oil and gas wells.

It is an object of the invention to provide a casing head so equipped as to support a plurality of strings of pipe in the well so that said strings may be sealed at their upper ends relative to each other.

It is a further object of the invention to provide a casing head and bushings connected therewith adapted to be interchangeable to accommodate different sizes of tubing or drill stem.

It is also desired to provide means connected with the casing head to prevent the leakage of fluid about the pipe which is being handled and which is flexible to allow the passage of pipe coupling therethrough.

The principal object of the invention is to provide a casing head adaptable for meeting different conditions in well drilling and pumping and adaptable to accommodate different sizes of pipe to be handled so that the proper pipe supporting and sealing devices may be employed without changing the casing head.

Figure 1:
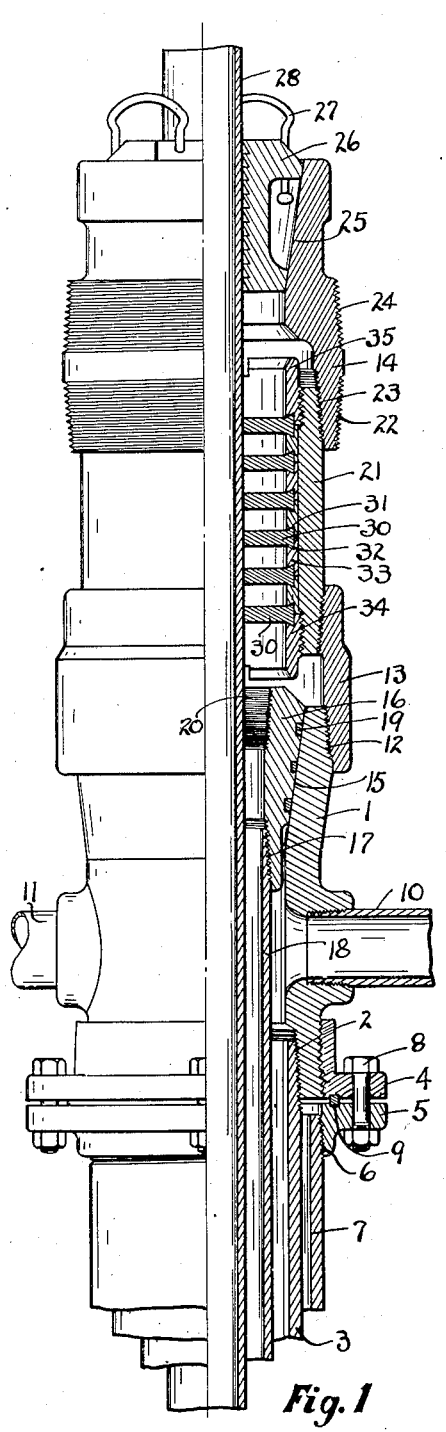

With reference to the drawing herewith wherein the invention is disclosed, Fig. 1 is a side view, partly in section and partly in elevation, showing my improved casing head with certain attachments thereon.

Figure 2:
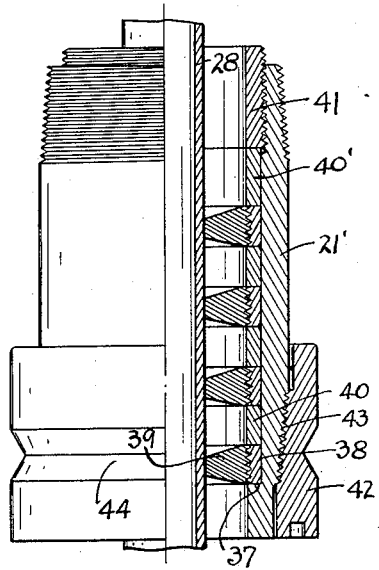
Figure 3:
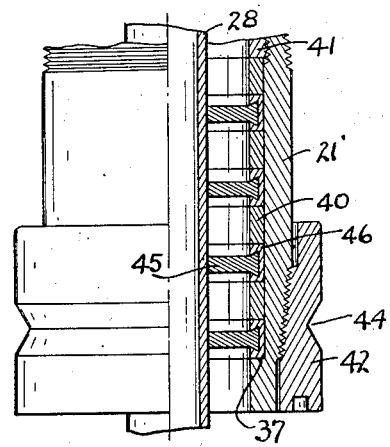

Fig. 2 is a side view partly in central longitudinal section illustrating a modified form of sealing device, and Fig. 3 is a view similar to Fig. 2 showing a still further embodiment of the sealing means.

In the drawing the casing head is shown at 1. It is threaded internally at its lower end at 2 for engagement with a pipe 3. The lower end is also provided with a radial flange 4 adapted to co-operate with a plate or ring 5 threaded internally at 6 to engage with the casing 7. The plate 5 and the flange 4 are secured together by means of bolts 8. Packing washers or gaskets 9 also may be employed between the plate and the flange to preserve a fluid seal around the upper end of the casing.

The casing head may have the common lateral outlet pipes 10 and 11 in the usual manner. The upper end of the casing head is flared outwardly in diameter and is threaded at 12 for engagement with a coupling 13 or with a pipe supporting means 14, as will be later noted. The interior of the flared upper end is formed with a downwardly tapered seat 15, which is adapted to receive the packing head 16 or other devices, such as the usual pipe engaging slips, as will be obvious.

The tapered seat 15 may act to receive a packing head 16, as previously noted, said packing head having its outer surface tapered to fit the seat. Its lower end is extended downwardly and threaded at 17 to engage with a pipe or liner 18. This liner is supported by the head 16 which rests by gravity within the seat 15 and forms a tight seal with said seat through means of packing rings 19. Said packing rings, as will be noted, are seated in grooves or channels formed circumferentially around the packing head and extending radially outward from the axis of the head. The upper end of the head is threaded at 20 to receive an extension of the pipe 18 or any operative device as may be convenient or expedient.

The bushing or slip bowl 14, which is spaced above the coupling 13 in Fig. 1 by means of a sleeve or barrel 21, is adapted to act as an attachment for the casing head and the lower end of said bushing is threaded at 22 to engage with a coupling 13, it being understood that the coupling 13 may assume any desired shape and may be swedged outwardly or inwardly to fit bushings 14 of different outer diameters. It is intended to suggest, therefore, by the threading of the bushing at 22, that it may be engaged with any coupling means connecting the casing head and the lower end of the bushing but that by threading it internally at 23 a spacing sleeve or barrel 21 may be connected between the coupling 13 and said bushing. Above the threaded surface 22 the bushing is tapered inwardly and is threaded at 24 to receive a cap or any similar device adapted to enclose the upper end of the bushing. The interior surface of the bushing is tapered at 25, forming a seat which may be used to receive pipe engaging slips 26, as shown.

The pipe engaging devices 26 may be of any well known type. Those indicated in the drawing comprise jaws toothed on their inner face and tapered on their outer face to fit the seat 25. The jaws are manipulated by handles 27 engaging in adjacent jaws. These jaws are adapted to engage an inner pipe 28 which may be a drill stem in drilling operations or may be a pump tubing if used in pumping operations. It is to be noted that by this arrangement four separate pipes are shown as extended from the surface into the well.

The sleeve or barrel 22 shown as connected between the coupling 13 and the bushing 14 acts as a support for a packer or wiping device. This wiping device is shown in Fig. 1 as comprising a plurality of vertically spaced discs or rings 30. Said rings may be made of rubber or other similar flexible composition. They are of sufficient width to fit between the pipe and the outer sleeve 21. Said rings are formed on their outer edges with laterally extending flanges forming a tenon 31, fitting within recesses 32 in spacing rings 33. The spacing rings 33 are formed with recesses 32, as noted, to engage against adjacent rings at each end of said spacers. The lower spacing ring 34 is longer than the adjacent rings and is adapted to clamp the lowermost ring 30 in position and is threaded to engage within the inner wall of the sleeve 21. A similar nut or ring 35 at the upper end of the packer serves to hold the uppermost ring in position and also tends to co-operate with the lower ring 34 to clamp the packing rings and spacers firmly together to form a unitary structure.

The flexible rings 30 are preferably formed of harder material adjacent the outer edges where they are clamped into engagement with the spacer ring. The interior edges, however, are flexible and a sufficient number of these sealing rings are provided so that the ordinary coupling may be forced longitudinally past the packing rings without allowing the escape of gas or liquid past the said rings 30. These rings also act as wiping rings to wipe the oil and mud from the pipe 28 when it is being withdrawn from the well under the pressure of gas in the well.

In Figs. 2 and 3 still further embodiments of the invention are shown. In the Fig. 2 embodiment the sleeve 21' is formed on its inner side with a lower shoulder 37 to provide a limiting means for the downward movement of the rings 38. Said rings 38 may be of metal threaded on their inner faces to receive the packing rings 39. Said packing rings are of material fairly flexible on their inner edges but more or less rigid where they are threaded to engage the rings 38. Said rings 38 are spaced apart by spacing rings 40 and as many of the packing rings 39 are employed as may be desired. The upper ring is clamped in position by a spacing ring 40' and above that a threaded ring or nut 41 is employed to clamp the assembly against the shoulder 37.

I have shown the sleeve 21' as engaged at its lower end with a collar 42, which is screwed upon the lower end of the sleeve at 43 and has on its outer periphery a groove 44. This groove, as will be noted, is formed with upper and lower beveled surfaces against which the usual screws formed in the ordinary casing head may engage and if desired the collar 42 may be used where my seal or wiper is employed with the usual casing head as ordinarily equipped.

In Fig. 3 the outer sleeve 21' is formed with the shoulder 37, as previously noted, but the wiping rings 45 are similar to those shown in Fig. 1 except that the rings 46 with which they are engaged are formed with morticed grooves on the inner side into which the outer margins of the rings 45 are moulded when said rings are formed. Thus each ring 45 when moulded within the ring 46 forms therewith an integral structure. The rings 46 are clamped between spacing rings 40, as in the Fig. 2 embodiment, and are supported firmly in position in the manner shown.

The seal or wiper just described is employed in well drilling or pumping operations particularly where gas pressure is present. With the well equipped as shown in Fig. 1 there will be no possibility of gas or oil escaping about the inner pipe 28 while it is being introduced into or withdrawn from the well. The flexible packing rings 30 form a tight seal against the pipe 28 so as to prevent the passage of gas or liquid and they are sufficiently flexible to prevent leakage even when couplings are forced vertically through the rings while the pipe is being withdrawn.

An advantage of the particular casing head construction which I have shown lies in the fact that different sized coupling 13 and bushings 14 may be employed with the same casing head. It will be obvious that if the coupling 13 is enlarged at its upper end it will be adapted to receive a larger bushing 14 while if it is swedged inwardly it may engage a still smaller bushing 14 and the said bushings 14 may be of different sizes to go with the same casing head in an obvious manner. Furthermore, the inner pipe 18 and the packing head 16 at its upper end may be omitted and the operation of the device will be otherwise the same. Furthermore, it will be noted that if the bushing 14 is engaged within the upper end of the coupling 13, the sizes being accommodated in an obvious manner for this purpose, then the sleeve 21 may project downwardly into the casing head and still serve to support the packing rings 30 as already noted. It is to be understood, therefore, that my device is adapted for adjustment to accommodate different sizes of pipe and to meet different emergencies occurring in the operation of a well in both drilling and pumping operations. It is particularly valuable in drilling operations where blowouts are imminent.

Having thus described my invention, what I claim as new is:

1. In a device of the character described, a casing head threaded externally at its upper end to receive a coupling member, a coupling thereon, a slip bowl disposed above said coupling, a sleeve secured on the inner face of said slip bowl and to said coupling, and tubing wiping devices in said sleeve.

2. In a device of the character described, a casing head threaded externally at its upper end to receive a coupling member, a coupling thereon, a slip bowl disposed above said coupling, a sleeve secured on the inner face of said slip bowl, and radially extending tubing wiping devices in said sleeve, said devices flexibly engaging said tubing to provide a seal therewith and adapted to be compressed to allow pipe coupling to pass.

In testimony whereof I hereunto affix my signature this 18 day of February, A. D., 1929.

JOSEPH H. McEVOY.